United States Patent
Gniesmer et al.

(10) Patent No.: US 10,066,579 B2
(45) Date of Patent: Sep. 4, 2018

(54) SIMPLE FRICTION WELD

(71) Applicant: KS KOLBENSCHMIDT GMBH, Neckarsulm (DE)

(72) Inventors: Volker Gniesmer, Alfed (DE); Gerhard Luz, Nordeim (DE); Jochem Müller, Neuenstein (DE); Christian Schaller, Assulzerstrasse (DE)

( * ) Notice: Subject to any disclaimer, the term of this patent is extended or adjusted under 35 U.S.C. 154(b) by 225 days.

(21) Appl. No.: 14/795,485

(22) Filed: Jul. 9, 2015

(65) Prior Publication Data

US 2016/0222909 A1 Aug. 4, 2016

Related U.S. Application Data

(63) Continuation of application No. 11/576,302, filed as application No. PCT/EP2005/010535 on Sep. 29, 2005, now abandoned.

(30) Foreign Application Priority Data

Sep. 29, 2004 (DE) .......... 10 2004 047 842
Dec. 22, 2004 (DE) .......... 10 2004 061 778

(51) Int. Cl.
| | | |
|---|---|---|
| *F02F 3/00* | (2006.01) | |
| *B23K 20/12* | (2006.01) | |
| *F02F 3/22* | (2006.01) | |
| *B23K 31/02* | (2006.01) | |
| *F01P 3/10* | (2006.01) | |
| *F02F 3/20* | (2006.01) | |
| *B23K 101/00* | (2006.01) | |

(52) U.S. Cl.
CPC ............ *F02F 3/003* (2013.01); *B23K 20/129* (2013.01); *B23K 31/02* (2013.01); *F01P 3/10* (2013.01); *F02F 3/20* (2013.01); *F02F 3/22* (2013.01); *B23K 2201/003* (2013.01); *F02F 2003/0061* (2013.01); *F02F 2200/04* (2013.01); *Y10T 29/49249* (2015.01)

(58) Field of Classification Search
CPC .............. F02F 3/003; F02F 2003/0061; Y10T 23/49252; Y10T 29/49249
USPC ........... 123/193.6, 41.35; 29/888.04; 92/176, 92/186, 231
See application file for complete search history.

(56) References Cited

U.S. PATENT DOCUMENTS

| 3,805,677 A | 4/1974 | Clary et al. |
|---|---|---|
| 3,882,021 A | 5/1975 | Ayres |
| (Continued) | | |

FOREIGN PATENT DOCUMENTS

| EP | 1061249 A2 | 12/2000 |
|---|---|---|
| EP | 180988591 B1 | 10/2010 |
| JP | 2091452 | 3/1990 |

*Primary Examiner* — Marguerite McMahon
*Assistant Examiner* — James Kim
(74) *Attorney, Agent, or Firm* — Young Basile Hanlon & MacFarlane, P.C.

(57) ABSTRACT

A cooling channel piston for an internal combustion engine which includes a piston bottom and a piston shaft that are joined thereto of a friction welding process. The piston bottom and the piston shaft jointly form a cooling channel. An annular wall which radially delimits the cooling channel towards the outside is formed by the piston bottom and/or the piston shaft. The annular wall can be sealed by a welding process once the piston bottom and the piston shaft have been joined together.

7 Claims, 2 Drawing Sheets

(56) References Cited

U.S. PATENT DOCUMENTS

| | | | | |
|---|---|---|---|---|
| 4,286,505 A | * | 9/1981 | Amdall | F02F 3/0015 123/41.35 |
| 4,372,194 A | | 2/1983 | Vallaude | |
| 4,532,686 A | * | 8/1985 | Berchem | B21K 1/18 123/193.6 |
| 4,587,932 A | * | 5/1986 | Moebus | F02F 3/0023 123/193.6 |
| 4,651,631 A | * | 3/1987 | Avezou | B23P 15/10 123/193.6 |
| 4,831,917 A | * | 5/1989 | Houben | F02B 23/0696 123/193.6 |
| 5,070,768 A | * | 12/1991 | Goncalves | F02F 3/003 123/41.35 |
| 5,081,968 A | | 1/1992 | Bruni | |
| 5,282,411 A | | 2/1994 | Hirai et al. | |
| 5,483,869 A | | 1/1996 | Bock et al. | |
| 5,975,040 A | * | 11/1999 | Silvonen | F02F 3/0023 123/193.6 |
| 6,032,619 A | | 3/2000 | Zhu et al. | |
| 6,112,642 A | | 9/2000 | Jarrett et al. | |
| 6,279,455 B1 | | 8/2001 | Kruse | |
| 6,477,941 B1 | * | 11/2002 | Zhu | F02F 3/003 92/186 |
| 6,486,577 B1 | | 11/2002 | Ursel et al. | |
| 6,651,549 B2 | | 11/2003 | Zhu et al. | |
| 6,729,291 B1 | | 5/2004 | Scharp et al. | |
| 6,763,758 B2 | | 7/2004 | Kemnitz et al. | |
| 7,533,601 B2 | * | 5/2009 | Lapp | F02F 3/0023 92/186 |
| 7,628,135 B2 | * | 12/2009 | Messmer | F02F 3/0023 123/193.6 |
| 7,918,155 B2 | * | 4/2011 | Lapp | F02F 3/003 29/888.042 |
| 2001/0051544 A1 | | 12/2001 | Kimoto et al. | |
| 2002/0046593 A1 | * | 4/2002 | Ribeiro | B21K 1/18 72/377 |
| 2002/0050883 A1 | | 5/2002 | Miyazaki et al. | |
| 2003/0051694 A1 | * | 3/2003 | Gaiser | F02F 3/003 123/193.6 |
| 2003/0188633 A1 | * | 10/2003 | Griffiths | F02F 3/0023 92/208 |
| 2004/0144247 A1 | | 7/2004 | Zhu et al. | |
| 2011/0119914 A1 | * | 5/2011 | Janssen | B23K 20/12 29/888.04 |

* cited by examiner

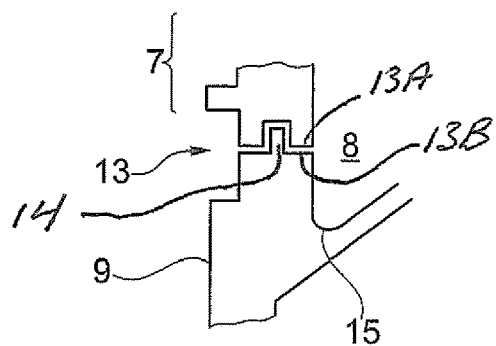
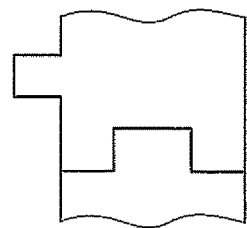
Fig. 2  Fig. 2a
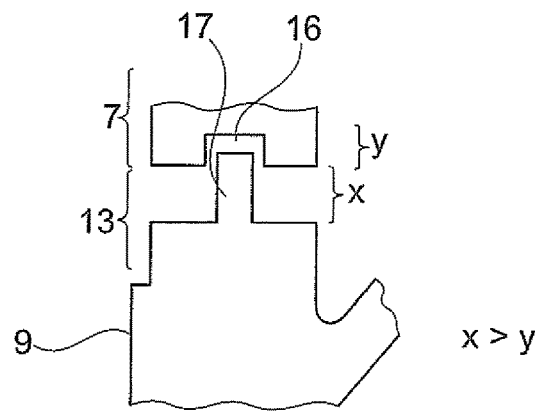
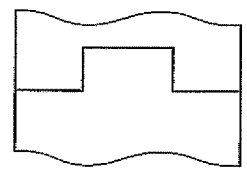
x > y
Fig. 3  Fig. 3a
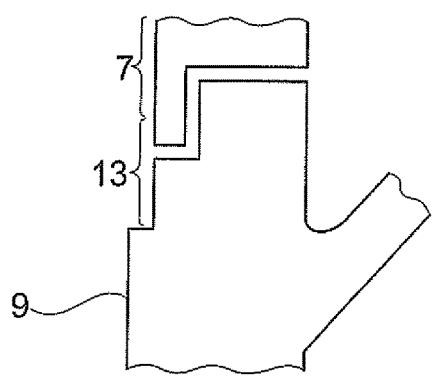
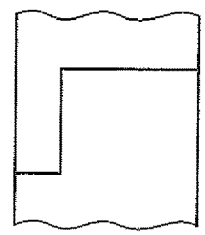
Fig. 4  Fig. 4a

SIMPLE FRICTION WELD

CROSS-REFERENCE TO CO-PENDING APPLICATION

This application is a continuation of co-pending U.S. patent application Ser. No. 11/576,302 filed Sep. 8, 2009, for a SIMPLE FRICTIONAL WELD, the entire contents of which are incorporated herein in its entirety.

BACKGROUND

The invention relates to a one-piece, steel welded cooling-channel piston of forged steel.

It is desirable to develop a piston surpassing the prior art in which the cooling channel or cooling cavity is tightly sealed. A piston of this type is described, for example, in the unpublished German patent application DE 10 2004 038 465.7.

A cooling channel piston is known from the previously published German patent application DE 102 44 512 A1 having the features which constitute the genre. The upper part of the piston has circumferential radial webs running coaxially behind the ring belt which are joined to corresponding webs on the piston skirt by means of friction welding. After the joining of piston upper part and piston lower part, the lower face of the ring belt is located adjacent the upper circumferential radial face of the piston skirt. In the state when piston upper and lower parts are joined, the outer piston wall areas between both parts of the piston form a contact surface which is characterized by a gap a few tenths of a millimeter wide. It can remain open or be sealed by means of a temperature-resistant sealing ring which is positioned before the joining of both parts of the piston on one of the contact surfaces, for example that of the lower part of the piston. A sealing ring of this kind has the advantage that the cooling channel is then closed to form a seal, but in a disadvantageous manner it represents an additional component which has to be produced and correctly positioned when the two parts of the piston are joined. In addition, the sealing ring, just like the few tenths of a millimeter wide gap without a sealing ring, has the disadvantage that the upper part of the piston (piston crown) cannot be supported on the lower part of the piston (piston skirt) while the piston is operating. While operating, the piston crown is deformed in a disadvantageous manner by the combustion pressures acting on it so that the strength and durability of the piston are compromised.

A cooling channel piston for a combustion engine is known from EP-A-1 061 249, having a piston crown and a piston skirt joined by means of friction welding, which together form a cooling channel, where a ring wall delimiting the cooling channel radially outward is formed by the piston crown and/or the piston skirt and the ring wall can be closed to form a seal by an interference fit and/or positive fit after piston crown and piston skirt have been joined. As shown in FIGS. 2 to 5, the surfaces of the ring belt and of the piston skirt facing each other are radially circumferential and coplanar with each other. The mutually coplanar facing surfaces on the lower edge of the ring belt and the upper edge of the piston skirt do not have any type of shoulder so that when the cooling channel piston is operating, there is no adequate support for the piston crown on the piston skirt. Only in FIG. 6 is it shown that the upwardly facing termination of the piston skirt has a single shoulder with which the coplanar aligned lower part of the ring belt can come into contact. This certainly improves the supporting effect, but not optimally. In addition, the inwardly directed L-shape of the shoulder at the upper end of the piston skirt is extremely difficult and expensive to manufacture with the required precision, so that no practical solution can be derived from EP-A-1 061 249.

Generic cooling channel pistons are also known from US 2004/144247 A1 and U.S. Pat. No. 6,698,391 in which, however, the circumferential radial lower edge of the ring belt and the upper edge of the piston skirt coming into contact therewith are also only configured coplanar so that the supporting effect is not disclosed.

It is therefore desirable to prepare a cooling channel piston which effectively avoids the disadvantages described above.

SUMMARY

In one aspect, the upper and lower parts of the cooling channel steel piston are first joined by means of friction welding or resistance press welding where a ring wall delimiting the cooling channel in an outward direction does not initially form a material bond and the tight sealing of the ring wall of the cooling channel is achieved by means of an interference and/or positive fit, and specifically, a subsequent welding process. An advantageous joining and closing of the cooling channel is now possible through the design of the cooling channel piston in accordance with the invention, wherein the joined parts, that is, piston crown and piston skirt, are joined by means of friction welding or resistance press welding. The subsequent external welding (not friction welding), or the corresponding shaping of the ring wall respectively, affects the cooling channel to the extent that no flashes from friction welding extend into the cooling channel in the area of the ring wall. Through the subsequent welding of the outer ring wall, or generally through the interference and/or positive fit, the piston is supported in the area of the ring belt, that is, the forces acting on the piston crown can be transferred to the piston skirt, which considerably increases the strength and durability of the cooling channel piston. At the same time, the welding also counteracts deformation in the skirt area, particularly in its upper area. In addition, manufacturing tolerances between the upper and lower part are compensated. In addition, provision is made in accordance with the invention for both the face of the ring wall below the ring belt and also the adjacent face of the ring side above the piston skirt to have a matching shoulder. As a result, both in the case of the interference fit and in the case of the positive fit connection the cooling channel is closed to from a seal and the support of the piston crown on the piston skirt is optimized in the contact or joint area.

Additional welded-in parts can be dispensed with due to the piston being formed only of piston crown and piston skirt, which considerably simplifies the manufacture of a cooling channel piston in accordance with the invention. Additionally, one advantage of the invention is that, depending on the configuration of the joint area around the ring wall, this joint area can serve to lend rigidity to and position the joined parts during the friction welding. A cost saving results at the same time because welded-in parts can be dispensed with in the area of the cooling channel.

BRIEF DESCRIPTION OF THE DRAWINGS

The friction weld will be described hereinafter with reference to an aspect of a friction weld which is not restricted and explained by the drawings in which:

FIG. 2 is an enlarged view of one aspect of the ring belt face;

FIG. 2a is the view in FIG. 2 showing the gap closed;

FIG. 3 is an enlarged view of another aspect of the ring belt face;

FIG. 3a is the view of FIG. 3 showing the gap closed;

FIG. 4 is an enlarged view of another aspect of the ring wall face; and

FIG. 4a is the view of FIG. 4 showing the gap closed.

DETAILED DESCRIPTION

Figure 1:
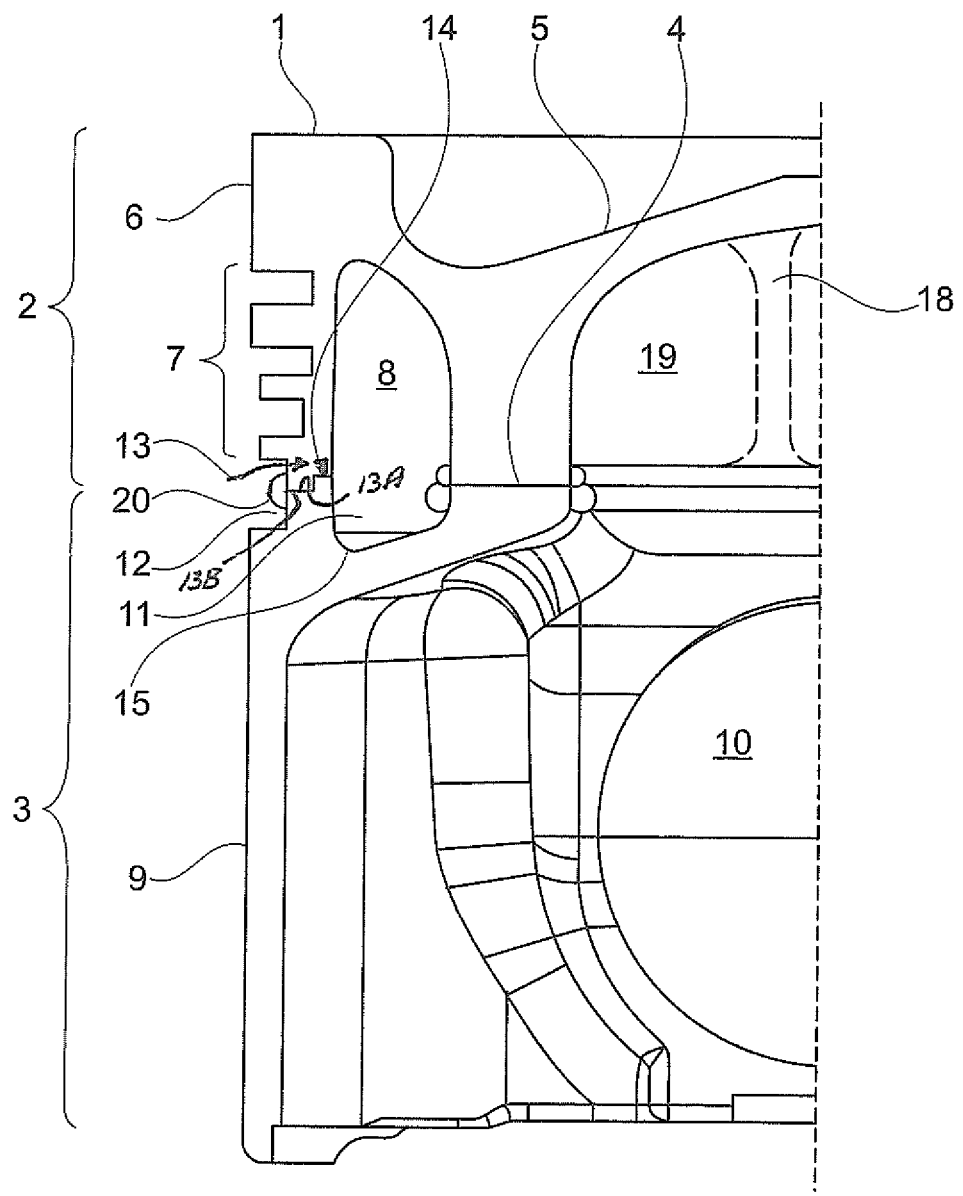
FIG. 1 shows the section through a one-piece, steel welded cooling channel piston, specifically of forged steel.

One half of a sectioned view of a piston and specifically of a cooling channel piston for a combustion engine is shown In FIG. 1. The cooling channel piston 1 shown here consists of a piston crown 2 and a piston skirt 3 which are joined by means of friction welding which results in a friction welding seam 4. The piston crown 2 is formed from a combustion bowl 5, an upper land 6, a ring belt 7 and one part of a cooling channel 8. The area of the piston skirt 3 comprises an outer skirt surface 9 of the cooling channel piston 1, a piston pin bore 10 and a lower part 11 of the cooling channel. The cooling channel 8 is consequently formed of an upper and a lower area 11 of the piston crown 2 and the piston skirt 3 and a recessed, circumferential web of the piston crown 2 and the piston skirt 3.

In this aspect, an additional groove 12 is introduced into the outer surface of the piston 1 below the ring belt 7. After the piston crown 2 and the piston skirt 3 have been joined by friction welding, the two parts of the piston 2, 3 merely abut each other in the area of the ring wall 13 without the existence of a material bond and/or tight connection in the area of this ring wall 13. The joining of the ring wall 13 is carried out in a subsequent, supplementary welding process. Here, the widest variety of welding processes (but not friction welding), such as for example, electron beam welding, WIG welding, MIG welding, MAG welding, laser welding, etc. 20 is conceivable.

In this aspect, a shoulder 14 is incorporated in the joint area of the ring wall 13 which has the advantage that when welding the ring wall 13, the weld seam root does not extend into the cooling channel 8 and in addition, a thick weld is made possible by welding up the shoulder and a clean, pore-free root is created.

The design of the shoulder 14 is not restricted to this aspect, but rather the creation of other shoulder shapes 14 in the area of the ring wall 13 is conceivable which either assist the subsequent welding process or have a positive effect on the friction welding.

An additional advantage of welding the ring wall 13 afterward is that until immediately before the final joining of the piston crown 2 and the piston skirt 3, inert gases can penetrate through the gap in the ring wall 13 into the area of the friction weld seam which in turn have a positive effect on the material structure in the friction weld seam 4. The location of the shoulder 14 in the area of the ring wall 13 is placed exactly in the center of the groove 12 only as an example. This shoulder 14 lies advantageously below the ring belt 7 and above the lower end 15 of the cooling piston channel. It is also conceivable in accordance with the invention not to introduce a groove 12 into the piston 1 and to form the ring wall 13 only with the surface of the skirt 9.

With a view to FIG. 1, it should be pointed out once more that the ring wall 13 is formed by the lower or first face 13A of the ring belt 7 and the upper or second face of the piston skirt 3. Because of the geometry in the area of the ring wall 13 shown in FIG. 1, the welding procedure can be performed particularly conveniently. The matching shoulders of the opposing faces, as already explained, prevent the weld seam from forming towards the cooling channel 8. Besides that, the advantage of the welding process to be performed radially on the outside remains, specifically that the weld seam projecting radially outward can be removed, for example by machining. In addition to this ring wall 13 geometry shown in FIG. 1, it is also conceivable that the ring wall second face or upper part of the piston skirt 3 has a plateau which the ring wall first or lower face of the ring belt 7 contacts after the friction welding process. It is also conceivable that the ring belt 7 is located on the piston skirt and comes into contact with a lower face below the upper land 6. The advantages described initially remain with these geometries as well. The basic principle of the present invention is important and advantageous, namely that the piston crown 2 and the piston skirt 3 have webs recessed from the outer surface running radially circumferential which are joined by means of friction welding while the ring wall 13, which is shaped so that the first 13A and second 13B faces of the ring wall 13 bordering each other (of the piston crown 2 and/or of the piston skirt 3) do not yet form a material joint in the friction welding process, is directly on the outer surface of the cooling channel piston 1. The welding of the adjacent first 13A and second 13B faces of the ring wall 13 takes place in an additional step from the outside only after piston crown 2 and piston skirt 3 have been joined through their internal webs by means of friction welding.

FIG. 2 shows the area of the ring wall 13 where the part of the ring wall first face 13A of the ring belt 7 projecting downward is configured in a grooved shape into which a radially circumferential shoulder 14 of the ring wall second face 13B facing upwards engages above the ring wall second face 13B of the piston skirt 9. Here too, welding the adjacent first 13A and second 13B faces of the ring wall 13 is subsequently carried out from the outside. This closes the cooling channel 8 completely as shown in FIG. 2a, the ring belt 7 is supported against deformation when the cooling channel piston 1 is operating, and the piston skirt is supported against deformation, in particular in the upper area.

FIG. 3 shows a section of the area of the ring wall 13 where the ring wall first face 13A lower circumferential section of the ring belt 7 and the ring wall 13 second face 13B upper circumferential section of the piston skirt 9 are shown. In the design in accordance with FIG. 3, the first face 13A of the ring wall 13 below the ring belt 7 is configured in the manner of a groove, similar to FIG. 2, but with the particular feature that the ring wall second face 13B circumferential tongue 17 has a height X which is greater than the depth Y of the groove 16. The procedure during manufacture of the cooling channel piston 1 is that piston crown 2 and piston skirt 3, as already described, are joined by means of friction welding or resistance press welding and thereby the first 13A and the second 13B faces of the ring wall 13 from FIG. 3 are at a distance (with a gap) and do not contact each other as shown in FIG. 3. Subsequently the cooling channel piston 1 is pressed together from above and from below, in the axial direction of the piston stroke. The opposed first face 13A of the underside of the ring belt 7 and of the second face 13B of the piston skirt 9 come into contact, where simultaneously the radially circumferential tongue 17 is deformed inside the radially circumferential groove 16 so that an interference fit and a positive fit result in the area of the ring wall 13 as shown in FIG. 3a, which ensures that the cooling channel 8 is closed to form a seal and at the same time the piston crown 2 can rest on the piston skirt 9. In one aspect, this interference and positive fit is sufficient, although it is also conceivable to reinforce the contact area additionally in the area of the ring wall 13 through a material bond by means of a welding procedure.

Something similar applies in the aspect in accordance with FIG. 4, where the first face 13A of the ring wall 13 below the ring belt 7 and the adjacent second face 13B of the ring side 13 above the piston skirt 9 both have a matching shoulder. In this instance also, as shown in FIG. 4, the opposing faces are not in initial contact after the piston crown 2 and piston skirt 3 have been joined, but instead a gap has formed. To eliminate the gap to achieve sealing of the cooling channel 8 and absorption of force for the piston crown 2 on the piston skirt 3, the cooling channel piston 1 is again exposed to a force from above or from below so that in the area of the contact surfaces an interference or a positive fit results as shown in FIG. 4a. The cooling channel 8 is sealed and absorption of force is provided so that in contrast to the aspect from FIG. 1, a welding procedure in the area of the ring wall 13 can be omitted.

In summary, it must be pointed out once again that initially the piston crown 2 is joined to the piston skirt 3 by means of friction welding or resistance press welding. This joining takes place in an area clearly set back from the ring belt 7 which is located coaxially between the back side of the ring belt 7 and the outer circumference of the combustion bowl 5 to achieve sufficient rigidity. Following this joining of piston crown 2 and piston skirt 3, the ring wall 13 (the area below the ring belt 7 and above the piston skirt 9) is closed by means of an interference and/or positive fit such that on the one hand the cooling channel 8 is sealed and on the other hand the piston crown 2 can rest on the piston skirt 3 in such a way that deformation of the piston crown 2 when the cooling channel piston 1 is operating is clearly reduced since the combustion pressures or forces acting on the piston crown 2 can be transferred to the piston skirt 9. In this case the contact area in the region of the ring wall 13 can still be materially joined by means of a welding process 20, but this can normally be dispensed with.

Alternatively, or additionally, the geometric relationships after the joining of piston crown 2 and piston skirt 3 are such that the first 13A and second 13B faces below the ring belt 7 and above the piston skirt 9 are not yet in contact, but a gap has formed. In order to seal the cooling channel 8 and to ensure the absorption of forces from the piston crown 2 to the piston skirt 3, this area of the ring wall 13 is closed as a positive fit by means of a welding procedure, as already described. The opposing faces can be configured planar or be configured from other geometric shapes (as for example step-shaped in accordance with FIG. 4 or tongue-and-groove as in FIG. 3.

With reference to FIG. 1, it must be pointed out supplementaly that in the internal region of the cooling channel piston 1 there may be, but does not have to be, an additional, radially circumferential web 18. This web 18 which can be manufactured with the cooling channel piston 1 or as a separate component which can be joined to the cooling channel piston 1 then forms at least one further cooling channel 19, where in addition to the two cooling channels 8, 19, which can also be described as cooling chambers, a cooling medium can be introduced centrally in the interior area of the cooling channel piston 1, permanently or circulating. Not shown, but present, are on the one hand means with which the cooling medium can be sprayed into the cooling channel or cooling channels, and on the other hand the necessary orifices, as for example holes on the underside of the interior area or also inside the webs separating the cooling channels.

What is claimed is:

1. A method of manufacturing a cooling channel piston for a combustion engine, comprising:
    forming a piston crown and a piston skirt, each having a complementary radially inner web;
    welding, by a first in time weld, the radially inner webs of the piston crown and the piston skirt which together form a cooling channel;
    forming a ring wall delimiting a radially outward portion of the cooling channel formed at least by one of the piston crown and the piston skirt;
    forming a matching shape on a first face of the ring wall below a ring belt and an adjoining second face of the ring wall above the piston skirt;
    maintaining a defined gap between the first face on the ring wall and the adjoining second face of the ring wall after the first in time weld; and
    fixedly closing the gap between the ring wall first and the second face adjacent the ring wall to form a seal by a locking fit after the piston crown and the piston skirt have been joined by the first in time weld.

2. The method of claim 1 wherein the ring wall first face is a lower face of the ring belt and the ring wall second face is an upper face of the piston skirt, the method further comprising:
    forming complimentary shoulders in the ring wall first face and the ring wall second face.

3. The method of claim 1 further comprising:
    forming the locking fit by an interference fit.

4. The cooling channel piston of claim 1 further comprising: forming the locking fit by a second weld on an outside of the ring wall.

5. The cooling channel piston of claim 4, wherein the second weld is a non-friction weld.

6. The cooling channel piston of claim 1, wherein one of the first face of the ring wall below the ring belt or the adjacent adjoining second face of the ring wall above the piston skirt defines an axial groove positioned inward from the axial extending exterior surfaces of the ring wall, the axial groove extending parallel to a piston stroke axis.

7. The cooling channel piston of claim 6 wherein the groove is positioned on the first face of the ring wall and comprises a circumferential groove, and wherein the ring wall second face comprises a circumferential tongue, wherein the circumferential groove in the ring wall first face has a lesser depth (X) than the circumferential tongue has height (Y), and the circumferential tongue being deformable after the piston crown and piston skirt have been joined.

* * * * *